(12) United States Patent
Akenine-Moller et al.

(10) Patent No.: US 9,501,864 B2
(45) Date of Patent: Nov. 22, 2016

(54) ADAPTIVE DEPTH OFFSET COMPRESSION

(71) Applicant: Intel Corporation, Santa Clara, CA (US)

(72) Inventors: Tomas G. Akenine-Moller, Lund (SE); Magnus Andersson, Helsingborg (SE); Jon N. Hasselgren, Bunkeflostrand (SE); Carl J. Munkberg, Malmo (SE); Robert M. Toth, Lund (SE)

(73) Assignee: Intel Corporation, Santa Clara, CA (US)

( * ) Notice: Subject to any disclaimer, the term of this patent is extended or adjusted under 35 U.S.C. 154(b) by 167 days.

(21) Appl. No.: 14/141,523

(22) Filed: Dec. 27, 2013

(65) Prior Publication Data

US 2015/0187124 A1 Jul. 2, 2015

(51) Int. Cl.
| | | |
|---|---|---|
| *G06T 15/40* | (2011.01) | |
| *G06F 3/14* | (2006.01) | |
| *G09G 5/393* | (2006.01) | |
| *G06T 9/00* | (2006.01) | |
| *G06T 15/00* | (2011.01) | |
| *G09G 5/39* | (2006.01) | |

(52) U.S. Cl.
CPC ............... *G06T 15/405* (2013.01); *G06F 3/14* (2013.01); *G06T 9/00* (2013.01); *G06T 15/005* (2013.01); *G09G 5/39* (2013.01); *G09G 5/393* (2013.01); *G09G 2340/02* (2013.01); *G09G 2360/122* (2013.01)

(58) Field of Classification Search
CPC ........ G06T 15/40; G06T 15/405; G06F 3/14
USPC .......................................................... 345/422
See application file for complete search history.

(56) References Cited

U.S. PATENT DOCUMENTS

| | | | | |
|---|---|---|---|---|
| 6,707,463 | B1* | 3/2004 | Gibson et al. | 345/619 |
| 6,762,758 | B2* | 7/2004 | Morein et al. | 345/422 |
| 8,923,389 | B1* | 12/2014 | Hoang | 375/240.02 |
| 2014/0376608 | A1* | 12/2014 | Tourapis | 375/240.02 |
| 2014/0376619 | A1* | 12/2014 | Tourapis | 375/240.03 |
| 2015/0187125 | A1* | 7/2015 | Hasselgren et al. | 345/422 |

OTHER PUBLICATIONS

Moller et al. "Stochastic Rasterization using Time-Continuous Triangles", ACM, 2007.*
Hasselgren, J., et al., "Efficient Depth Buffer Compression," In Graphics Hardware (2006), 8 pages.
Rasmusson, J., et al., "Exact and Error-bounded Approximate Color Buffer Compression and Decompression," In Graphics Hardware (2007) 9 pages.

(Continued)

*Primary Examiner* — Kimbinh T Nguyen
(74) *Attorney, Agent, or Firm* — Trop Pruner & Hu, P.C.

(57) ABSTRACT

Because using the same number of bits per residual depth offset compression is not the best distribution of bits, the bits per residual may be distributed instead according to the content of the depths of a tile. For example, if the depth differences close to the Zmax are small, then fewer bits can be spent on residuals for the samples that are encoded relative to Zmax. Consequently, more bits can be spent on the residuals for the samples that are encoded relative to Zmin. As a result, more tiles succeed at compressing to the required number of bits.

30 Claims, 6 Drawing Sheets

(56) References Cited

OTHER PUBLICATIONS

U.S. Appl. No. 13/867,250, filed Apr. 22, 2013 entitled "Color Buffer Compression".

U.S. Appl. No. 13/795,720, filed Mar. 12, 2013 entitled "Creating an Isolated Environment in a Co-Designed Processor".

* cited by examiner

ADAPTIVE DEPTH OFFSET COMPRESSION

BACKGROUND

This relates generally to graphics processing for computers and particularly to depth offset compression.

In depth offset compression, the minimum depth (Zmin) and maximum depth (Zmax) of a tile or rectangular region of pixels is stored. Each sample's depth is encoded relative to either Zmin or Zmax. The remaining bits are used to store a mask that indicates whether each sample is taken relative to Zmin or Zmax and encodes the so-called "residual bits" that specify the difference value for each sample relative to either Zmin or Zmax. Existing depth offset compression techniques use the same number of bits per residual.

Compression methods are becoming increasingly important for graphics hardware architectures because they may reduce the power and/or increase performance. Compression is successful if all the residuals are small enough to fit within the desired bit budget of the tile. Otherwise the data may be stored in uncompressed form or compressed using some other technique. The same depth offset compression can also be used on individual color components for color buffer compression.

BRIEF DESCRIPTION OF THE DRAWINGS

Some embodiments are described with respect to the following figures.

DETAILED DESCRIPTION

Because using the same number of bits per residual is not the best distribution of bits, the bits per residual may be distributed instead according to the content of the depths of a tile. For example, if the depth differences close to the Zmax are small, then fewer bits can be spent on residuals for the samples that are encoded relative to Zmax. Consequently, more bits can be spent on the residuals for the samples that are encoded relative to Zmin. As a result, more tiles can be compressed down to the required number of bits.

Figure 1:
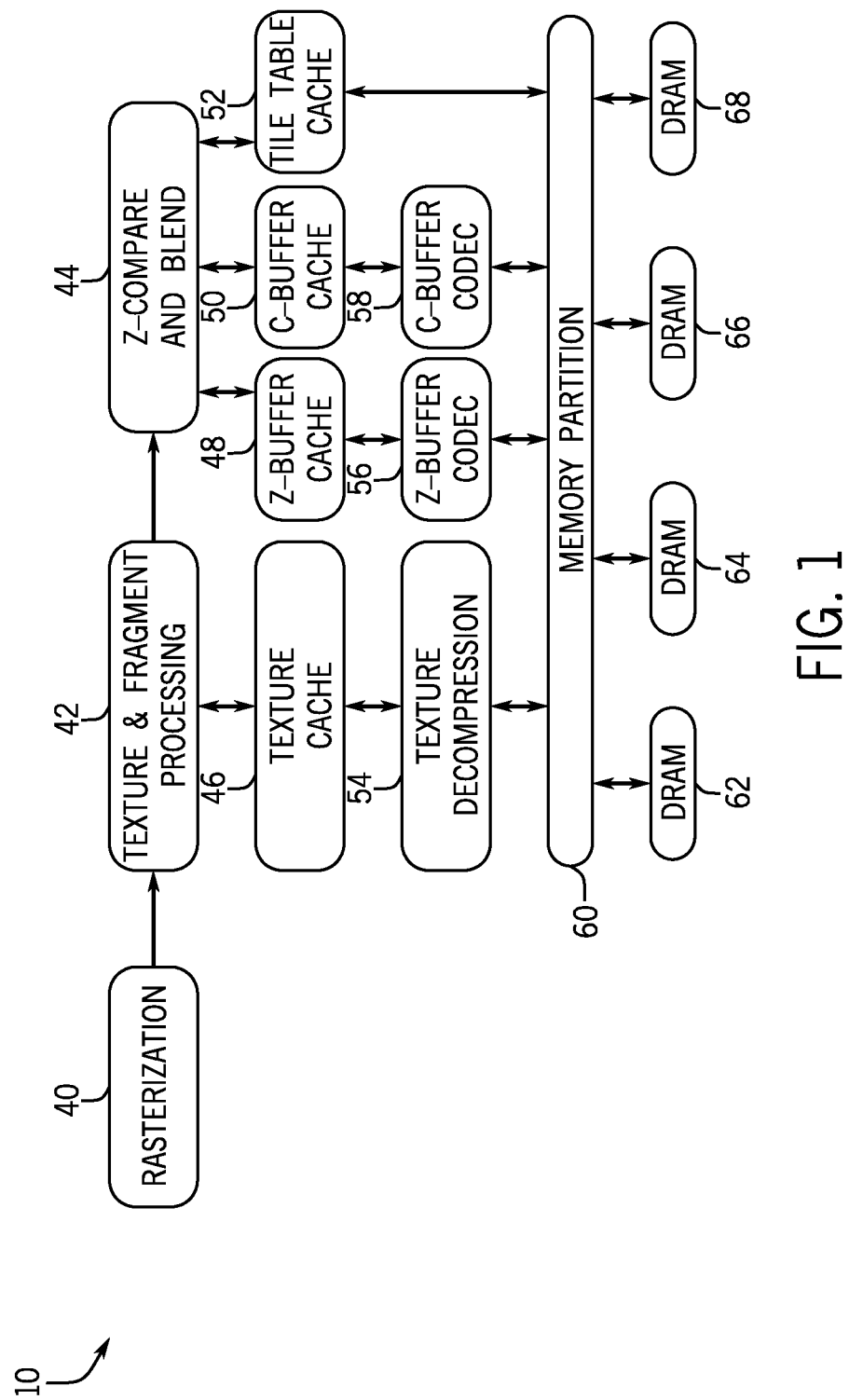
FIG. 1 is a schematic depiction of one embodiment.

In FIG. 1, a graphics processor 10 may include a rasterization pipeline including a rasterization unit 40, a texture and fragment processing unit 42, and a depth or Z compare and blend unit 44. Each of these units may be implemented in whole or in part by software or hardware in some embodiments.

The texture and fragment processing unit 42 is coupled to a texture cache 46. The cache 46 is in turn coupled to a memory partition 60 through a texture decompression module 54. Thus, texture information stored in the cache may be decompressed between the memory partition and the cache.

The depth compare and blend unit 44 is coupled to a depth buffer cache 48, a color buffer cache 50 and a tile table cache 52. In turn, the depth buffer cache 48 is coupled to the memory partition 60 through the depth buffer coder/decoder (codec) 56. Likewise, the color buffer cache 50 couples the memory partition 60 through the color buffer coder/decoder (codec) 58. The memory partition 60 may be coupled to dynamic random access memory (DRAM) 62, 64, 66 and 68 which may be part of system memory. In some embodiments, a unified cache may be used that includes the texture cache, the depth buffer cache and the color buffer cache.

In some embodiments, a unified codec may replace the units 54, 56, and 58. Various configurations are described in further detail in the article, *Floating Point Buffer Compression in a Unified Codec Architecture* by Ström, et al. Graphics Hardware (2008).

In accordance with one embodiment of adaptive depth offset compression, a bit is extracted by testing whether Zmin is less than Zmax. If so, then the extracted bit is set equal to zero and otherwise the extracted bit is set equal to one. If standard depth offset compression is used this is flagged by setting the bit to zero and if adaptive depth offset compression is used it is flagged by setting the bit to one in one embodiment, (but the opposite bit scheme may also be used). In one embodiment, both regular depth offset and adaptive depth offset compression are applied to the tile, and the first algorithm that can successfully compress the tile is selected. It is also possible to use heuristics to select up-front which compression algorithm to use based on tile properties, thereby saving the extra work of running both compression algorithms. As a consequence, the adaptive results are always better or at least equal to the standard depth offset compression. When part of a tile is cleared, zero bits may be allocated for the samples that are encoded relative to Zmax (i.e. the cleared samples), and more bits may be allocated to the other residuals. A mechanism for rebalancing the residuals with a given bit distribution, further increases the likelihood of successfully compressing a tile.

The adaptive depth offset compression stores Zmin and Zmax values per tile as well as one bit per depth sample to indicate whether the depth sample is encoded relative to Zmin or Zmax. These latter bits together are called the selection mask for the tile. In the compressed representation, Zmin, Zmax and the selection mask are encoded.

If Zmin is less than Zmax, the rest of the representation contains a standard depth offset compression, where each residual has the same number of bits. However if Zmin is greater than or equal to Zmax, then the compressed representation contains an adaptive depth offset compressed tile where Zmin and Zmax values are swapped.

If the tile is in the adaptive depth offset compression mode, Zmin, Zmax, and a selection mask are stored and then N bits are stored to indicate the distribution of the residual bits. The value of these N bits may be represented by Zminbits, which is the number of bits used for the depth samples that are encoded relative to Zmin. A similar notation, Zmaxbits, may be used for the corresponding bits related to Zmax. If there are S depth samples per tile, and there are M depth samples that are encoded relative to Zmin, therefore there are S−M depth samples that are encoded relative to Zmax. Note that M can be extracted from the selection mask.

After encoding Zmin, Zmax, the selection mask and the indicator of whether depth offset or adaptive depth offset compression is used, there are L bits to spare for the residuals. The maximum number of bits for the values encoded relative to Zmax may be computed as: Zmaxbits=floor ((L−Zminbits*M)/(S−M)).

Figure 2:
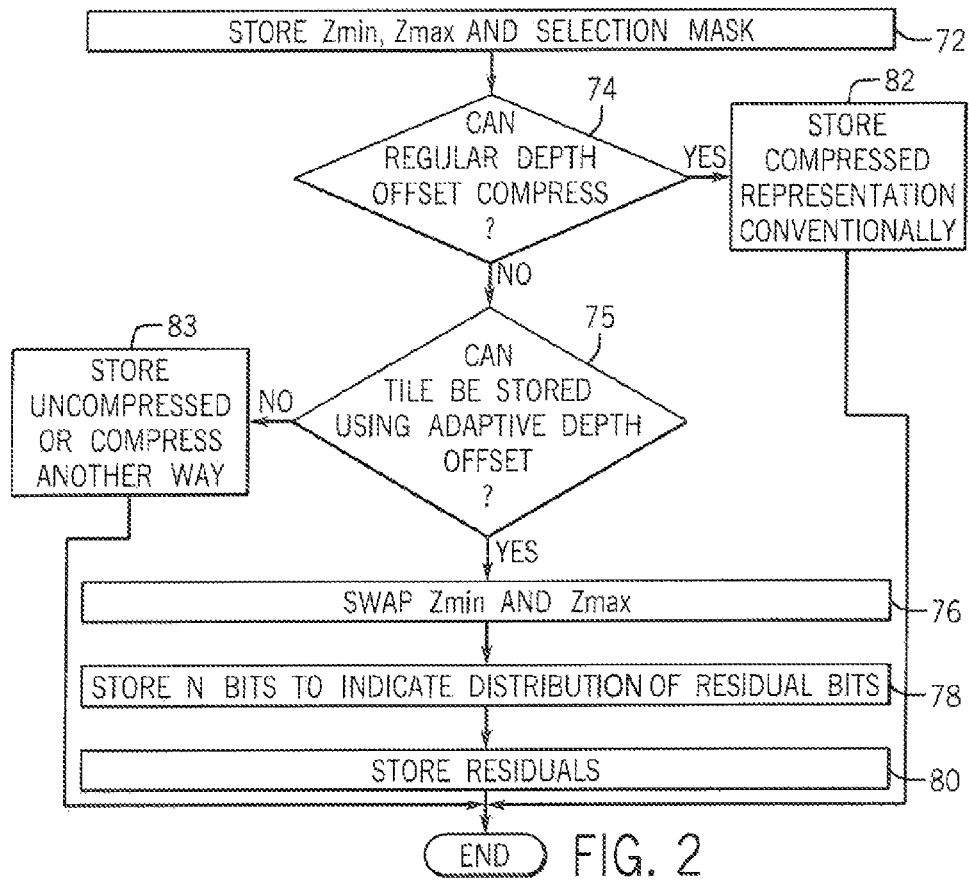
FIG. 2 is a flow chart for one embodiment.

A sequence for implementing the adaptive depth offset compression, shown in FIG. 2, may be implemented in software, firmware and/or hardware. In software and firmware embodiments it may be implemented by computer executed instructions stored in one or more non-transitory computer readable media such as magnetic, optical or semiconductor storages. For example, referring to FIG. 1, the instructions may be stored in cache 50 or DRAM 62, 64, 66 or 68 to mention a few examples.

The sequence begins by storing the Zmin, Zmax and selection mask as indicated in block 72. Then a check at diamond 74 determines whether the regular depth offset, or the adaptive depth offset, algorithm could successfully compress the tile. If the tile can be compressed using regular depth offset, the compressed representation is stored in accordance to prior art. If the tile can be stored using adaptive depth offset (diamond 75), the Zmin and the Zmax values are swapped as indicated in block 76. Next, N bits are stored to indicate a distribution of residual bits as indicated in block 78. Then the residuals are stored as indicated in block 80.

If neither regular depth offset nor adaptive depth offset can successfully compress the tile, it is stored in uncompressed form (block 83), or compressed using another algorithm (block 82).

Figure 7:
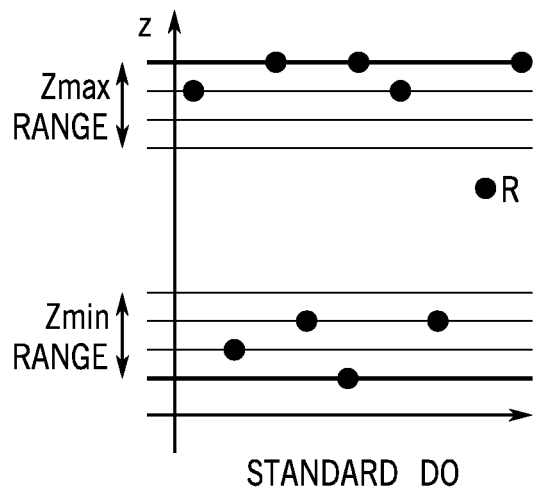
FIG. 7 is a graph of allocated bits for Zmin on the vertical axis and sample location across the tile in the horizontal axis.
Figure 8:
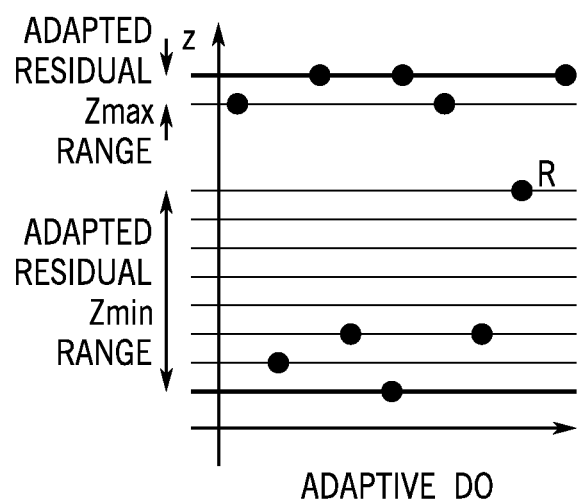
FIG. 8 is a depiction of a hypothetical example of the same graph showing how the distribution could be handled in accordance with one embodiment.

Referring to FIG. 7, the standard depth offset algorithm fails to compress the tile in this example because the sample R is not representable within the residual range. In contrast as shown in FIG. 8, the same distribution can be handled by adaptively allocating the number of residual bits for Zmin and Zmax so that there are more bits for the adapted Zmin range and, as a result, the tile can be represented within the bit budget, which is the same in both figures.

The algorithm for classifying each depth sample as belonging to the Zmin or Zmax range reduces the number of bits required to encode the tile rather than using the distance from the Zmin/Zmax reference depths. For example, if the majority of samples lie close to Zmin, it is better to represent an outlying sample relative to Zmax and increase the bit cost of the relatively few samples encoded relative to Zmax.

In a two-step algorithm, the first step creates two histograms, one for Zmin and Zmax respectively. Each histogram bin represents how many of the samples can be encoded relative to that value, given a number of bits to represent the residuals. In the second step, the number of minimum and maximum residuals is initialized to zero and the number of encoded samples for each range is initialized to zero. Then the histograms are used and the number of residual bits are increased for the range that will increase the total bit count the least. The process iterates until all samples have been encoded or the allowed bit budget is passed.

Figure 3:
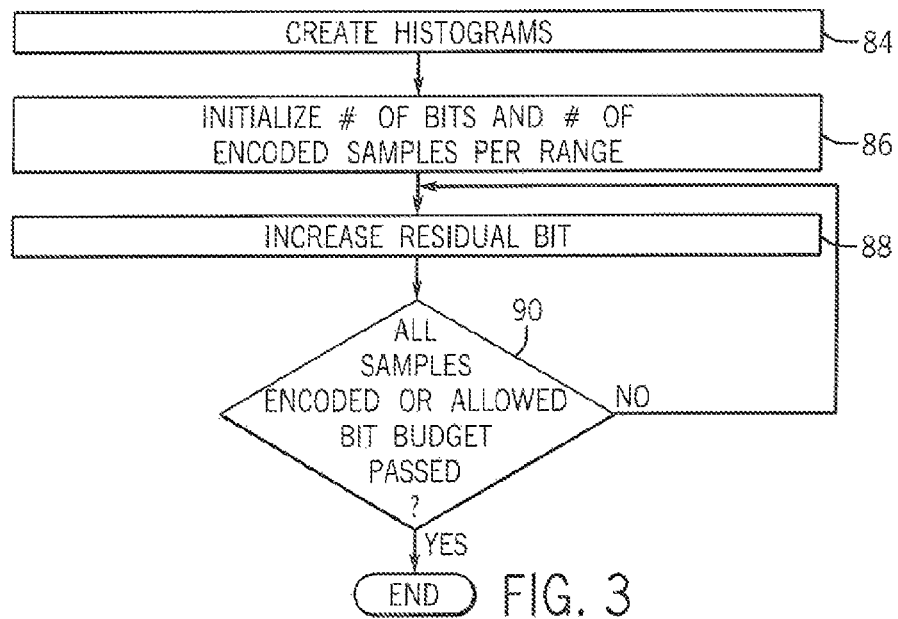
FIG. 3 is a flow chart for splitting residuals according to one embodiment.

A sequence, shown in FIG. 3, for classifying each depth sample as belonging to Zmin or Zmax may be implemented in software, firmware and/or hardware. In software and firmware embodiments, it may be implemented by computer executed instructions stored in one or more non-transitory computer readable media such as magnetic, optical, or semiconductor storages. For example in one embodiment, the instructions may be stored in the cache 50 or DRAM 62, 64, 66 or 68 to mention a few examples shown in FIG. 1.

The sequence begins in block 84 by creating the histograms for Zmin and Zmax respectively. Then the number of bits and the number of encoded samples per range are initialized as indicated in block 86. Thereafter, the residual bit that increases the total bit budget the least is increased (block 88). A check at diamond 90 determines whether all samples are now encoded or whether the allowed bit budget is passed. If so, the flow ends and otherwise the flow iterates back through block 88.

In accordance with another way of splitting the residuals, the second step of the above-described method of partitioning the residuals is altered to obtain an exhaustive search that is guaranteed to find the solution if a solution exists. First, the cumulative sum of the Zmin histogram is computed. After that, all possible values of Zmin bits are tested, from lowest to highest, until a solution is found.

Figure 4:
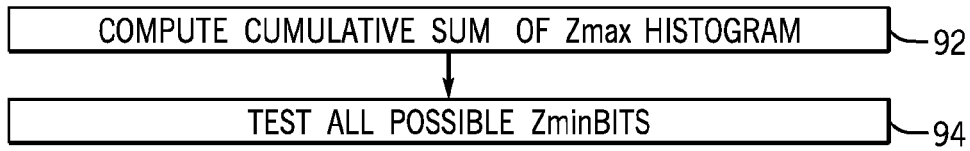
FIG. 4 is a flow chart for another technique for splitting the residuals.

A sequence for this technique for splitting the residuals, shown in FIG. 4, may be implemented in software, firmware, and/or hardware. In software and firmware embodiments it may be implemented by computer executed instructions stored in one or more non-transitory computer readable media such as magnetic, optical, or semiconductor storages. Referring to FIG. 1, the instructions may be stored in the cache 50 or DRAM 62, 64, 66 or 68 to mention a few examples.

The sequence begins by computing the cumulative sum of the Zmax histogram as indicated in block 92. Then all possible Zminbits are tested as indicated in block 94, and the testing continues either until a solution is found, or until there are no more reasonable values to try for Zminbits.

The test for a given Zminbits value shown in block 94 is as follows. The number of samples M that can be encoded relative to Zmin with Zminbits is determined by adding the next value from the Zmin histogram, effectively computing the cumulative sum of the Zmin histogram. The number of samples that cannot be encoded and thus have to be encoded relative to Zmax is S−M. The bit budget for encoding these samples is the Zmaxbits=floor ((L−M*Zminbits)/(S−M)) as described above. The number of samples that can be encoded relative to Zmax with Zmaxbits, K, is looked up in the cumulative sum of the Zmax histogram. Finally if K+M>=S, then all samples can be encoded with the tested Zminbits and Zmaxbits combination and a solution has been found. If no solution was found was after trying all possible Zminbits, then the tile cannot be compressed.

Figure 5:
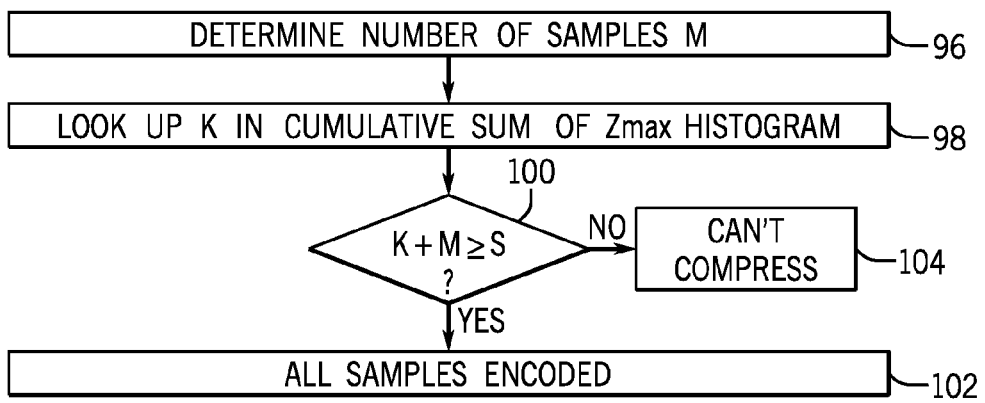
FIG. 5 is a flow chart for showing how to test all possible Zmin bits as shown in FIG. 4 according to one embodiment.

The sequence shown in FIG. 5 may be used to implement this test for a given Zminbits value. It may be implemented in software, firmware, and/or hardware. In software and firmware embodiments it may be implemented by computer executed instructions stored in one or more non-transitory computer readable media such as magnetic, optical, or semiconductor storages. Referring to FIG. 1, it may for example, be stored in the cache 50 or DRAM 62, 64, 66 or 68 to mention a few examples.

The sequence begins by determining the number of samples M as indicated in block 96. And K is looked up in the cumulative sum of the Zmax histogram as indicated in block 98.

A check at diamond 100 determines whether K+M is greater than or equal to S. If so, all samples are encoded as indicated in block 102. Otherwise the samples cannot be compressed with this technique as indicated in block 104.

If the distribution of sample associations with Zmin and Zmax is highly skewed because one or the other extreme has few samples associated with it, then the range distribution can be altered without affecting the number of bits per sample. The selection mask is extended to store two bits per sample. As a result, there are four possible combinations, only one of which means that the less dominant extreme, either Zmin or Zmax is referenced. The remaining three combinations mean that the more dominant one is referenced. These three different remaining combinations representing the same extreme provide one and half bits of extra residual by prepending two most significant bits as 00, 01, or 10 to residuals depending on the mask code.

Thus, the addressable range at the non-dominant extreme is reduced by half since one bit per sample less is available in L. While the addressable range of the dominate extreme is extended by 50% since the range is tripled, but there is one bit per sample less available in L as compared to using a single bit per sample mask while using the exact same number of total bits.

Whether this two bit sample mask encoding is used or not is conveyed to the decoder by various means. For instance, by storing a single, extra bit per tile, the system can indicate which mask mode is applied to a given tile. Splitting the residual can also be augmented to work with the skewed distributions by simply enlarging or diminishing the bins according to the 50% growth or reduction described herein while continuing as usual.

If needed, Zminbits can be quantized in order to save storage. The drawback is that fewer different distributions become possible to use. One can either use linear or non-linear quantization.

Figure 6:
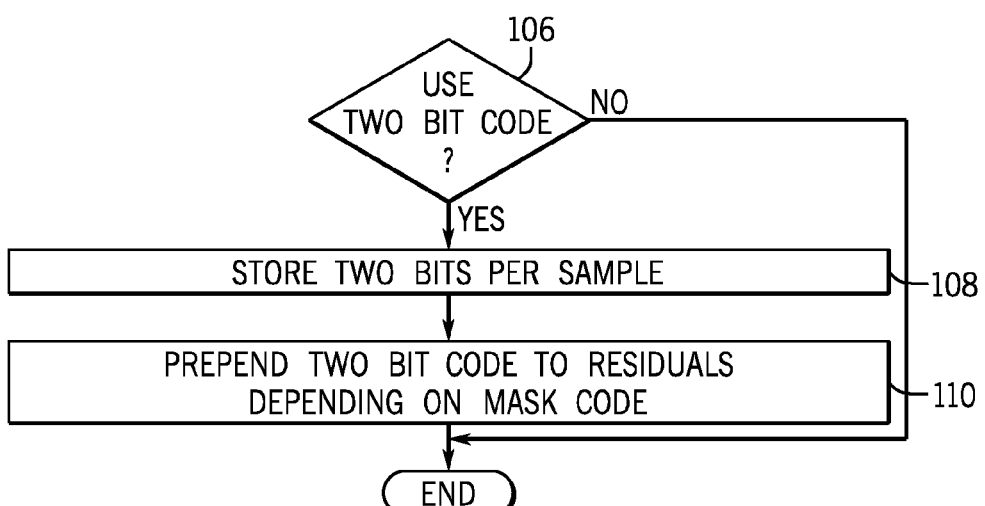
FIG. 6 is a flow chart for handling skewed distributions of Zmin and Zmax according to one embodiment.

A sequence shown in FIG. 6 may be used in cases where the distribution of sample associations is highly skewed. It may be implemented by software, firmware and/or hardware. In software and firmware embodiments it may be implemented by computer executed instructions stored in one or more non-transitory computer readable media such as magnetic, optical, or semiconductor storages. For example referring to FIG. 1, the instructions may be stored in the cache 50 or DRAM 62, 64, 66 or 68 to mention a few examples.

The sequence begins in diamond 106 by determining whether a two bit code has been specified. If so, the two bits are stored per sample as indicated in block 108. Then the two bit code is prepended to the residuals depending on the mask code as indicated in block 110.

Figure 9:
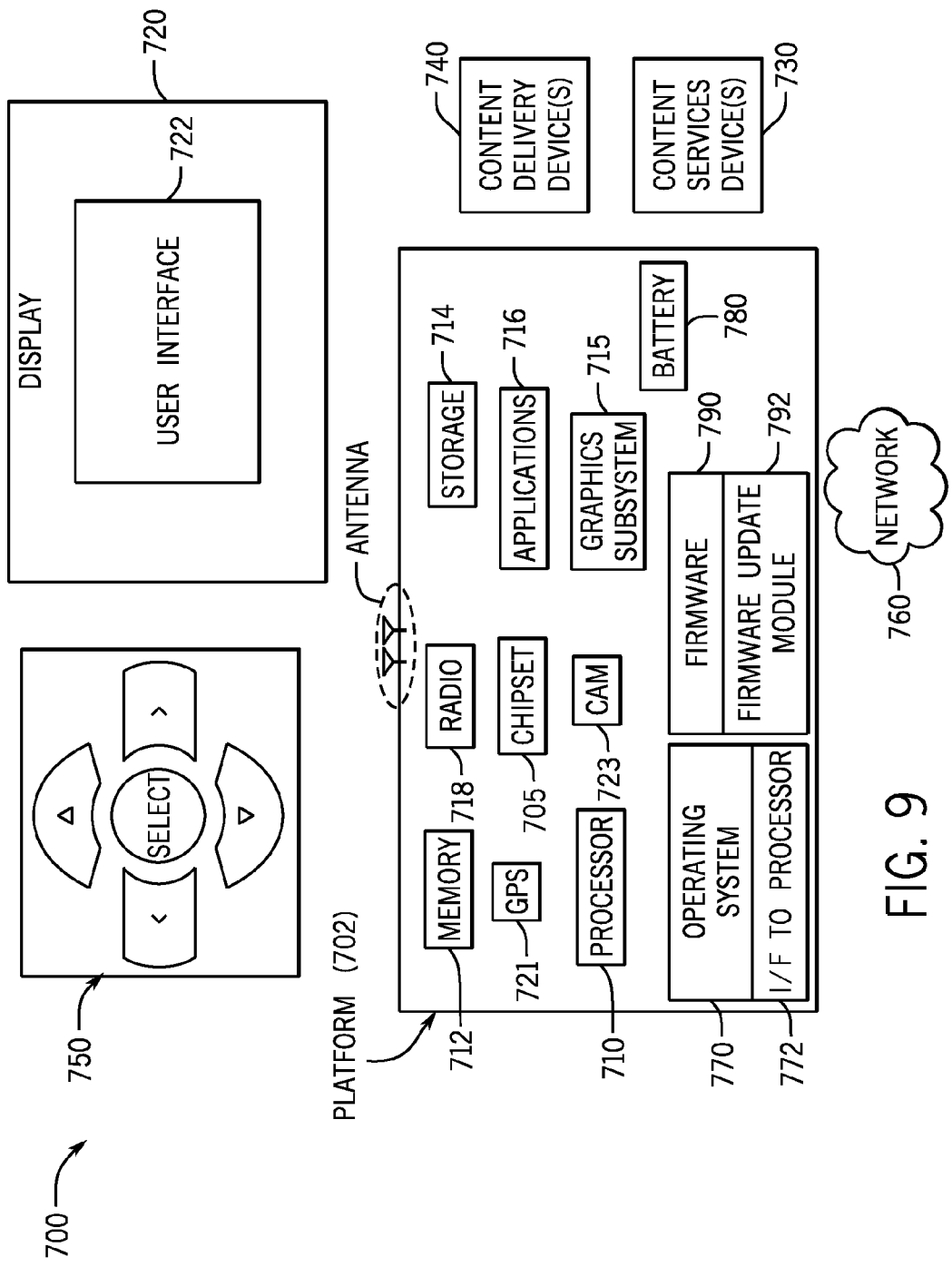
FIG. 9 is a system depiction for one embodiment.

FIG. 9 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 2 to 6, together with memory 712.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the disclosure.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIGS. 2 to 6 in software and/or firmware embodiments.

Figure 10:
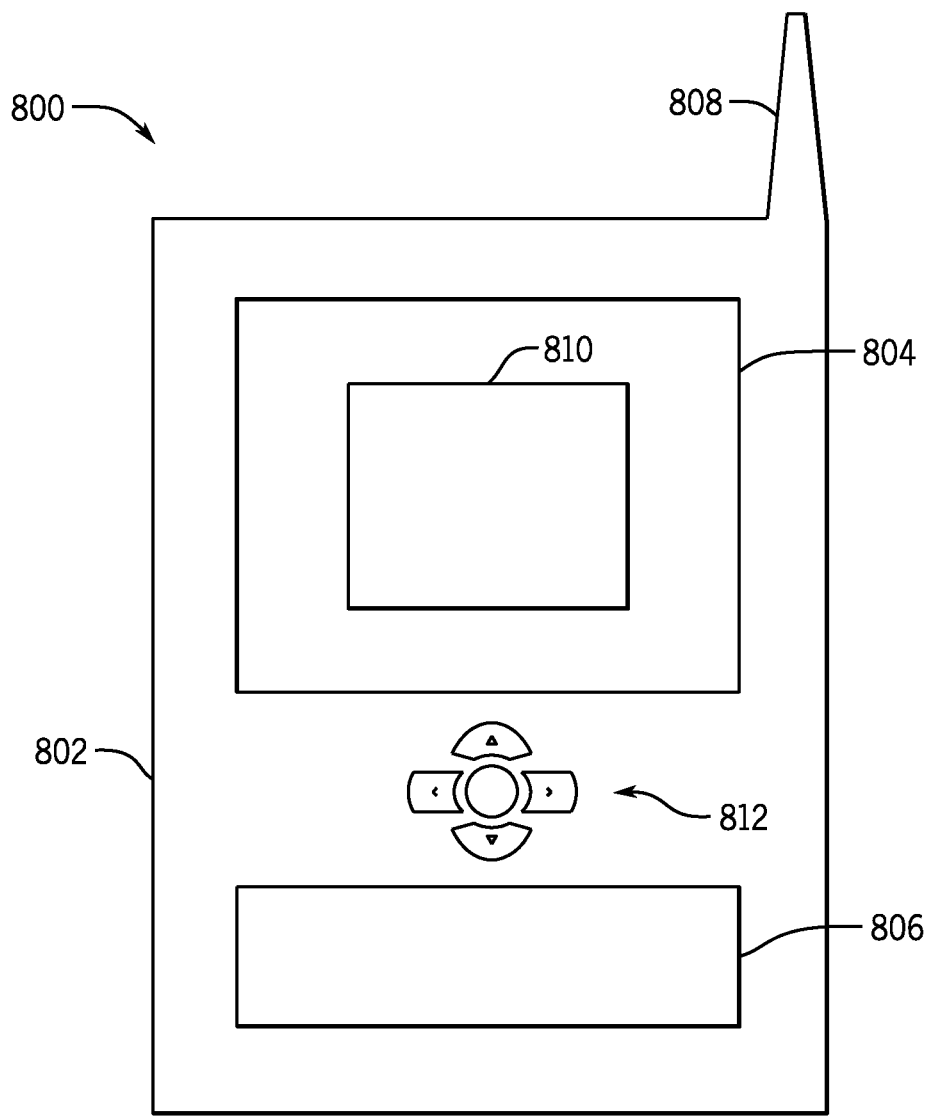
FIG. 10 is a front elevational view of one embodiment.

As shown in FIG. 10, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising using a processor to decide whether to use depth offset compression or adaptive depth offset compression, and indicating adaptive depth offset compression by swapping Zmin and Zmax. The method may also include when adaptive offset is used, swapping Zmin and Zmax, and storing bits to indicate a distribution of residual bits for the residuals encoded relative to Zmin and Zmax. The method may also include storing the residual bits for the samples that are encoded relative to Zmin using a first number of bits per residual and storing the residuals for the samples that are encoded relative to Zmax using a second number of bits, wherein the first and second numbers are different. The method may also include deciding whether a depth sample belongs to a Zmin or Zmax range by creating histograms for Zmin and Zmax, where each bin represents how many samples may be encoded relative to a Zmin or Zmax value given a number of bits to represent the residuals. The method may also include using the histogram and increasing the number of residual bits for a range to produce the least increase in a total bit count. The method may also include computing a cumulative sum of the Zmax histogram and testing all possible values of bits that indicate a distribution of residual bits for Zmax. The method may also include determining the remaining number of samples that must be encoded relative to Zmax, determining the bit budget for encoding said amount of samples relative to Zmax, and determining if the cumulative sum of the Zmax histogram up to said bit budget is at least as large as said number of samples that need to be encoded relative to Zmax. The method may also include storing two bits per sample to indicate by one combination a less dominant range distribution and by three combinations in more dominant range distribution. The method may also include indicating whether to use one or two bits to represent the range distribution by storing a single bit extra per tile. The method may also include using different numbers of residual bits for Zmin residuals and for Zmax residuals.

Another example embodiment may be one or more non-transitory computer readable media storing instructions executed by one or more processors to perform a method comprising using a processor to decide whether to use depth offset compression or adaptive depth offset compression, and indicating adaptive depth offset compression by swapping Zmin and Zmax. The media may include said method including when adaptive offset is used, swapping Zmin and Zmax, and storing bits to indicate a distribution of residual bits for the residuals encoded relative to Zmin and Zmax. The media may include said method including storing the residual bits for the samples that are encoded relative to Zmin using a first number of bits per residual and storing the residuals for the samples that are encoded relative to Zmax using a second number of bits, wherein the first and second numbers are different. The media may include said method including deciding whether a depth sample belongs to a Zmin or Zmax range by creating histograms for Zmin and Zmax, where each bin represents how many samples may be encoded relative to a Zmin or Zmax value given a number of bits to represent the residuals. The media may include said method including using the histogram and increasing the number of residual bits for a range to produce the least increase in a total bit count. The media may include said method including computing a cumulative sum of the Zmax histogram and testing all possible values of bits that indicate a distribution of residual bits for Zmax. The media may include said method including determining the remaining number of samples that must be encoded relative to Zmax, determining the bit budget for encoding said amount of samples relative to Zmax, and determining if the cumulative sum of the Zmax histogram up to said bit budget is at least as large as said number of samples that need to be encoded relative to Zmax. The media may include said method including storing two bits per sample to indicate by one combination a less dominant range distribution and by three combinations in more dominant range distribution. The media may include said method including indicating whether to use one or two bits to represent the range distribution by storing a single bit extra per tile. The media may include said method including using different numbers of residual bits for Zmin residuals and for Zmax residuals.

In another example embodiment may be an apparatus comprising a processor to decide whether to use depth offset compression or adaptive depth offset compression and to indicate adaptive depth offset compression by swapping Zmin and Zmax, and a memory coupled to said processor. The apparatus may include when adaptive offset is used, said processor to swap Zmin and Zmax, and storing bits to indicate a distribution of residual bits for the residuals encoded relative to Zmin and Zmax. The apparatus may include said processor to store the residual bits for the samples that are encoded relative to Zmin using a first number of bits per residual and to store the residuals for the samples that are encoded relative to Zmax using a second number of bits, wherein the first and second numbers are different. The apparatus may include said processor to decide whether a depth sample belongs to a Zmin or Zmax range by creating histograms for Zmin and Zmax, where each bin represents how many samples may be encoded relative to a Zmin or Zmax value given a number of bits to represent the residuals. The apparatus may include said processor to use the histogram and increase the number of residual bits for a range to produce the least increase in a total bit count. The apparatus may include said processor to compute a cumulative sum of the Zmax histogram and test all possible values of bits that indicate a distribution of residual bits for Zmax. The apparatus may include said processor to determine the remaining number of samples that must be encoded relative to Zmax, determine the bit budget for encoding said amount of samples relative to Zmax, and determine if the cumulative sum of the Zmax histogram up to said bit budget is at least as large as said number of samples that need to be encoded relative to Zmax. The apparatus may include an operating system, a battery and firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
using a processor to decide whether to use depth offset compression or adaptive depth offset compression to encode depths of objects depicted in an image, wherein depth is a distance from an imaging device and wherein an adaptive depth offset compression swaps minimum depth (Zmin) values and maximum depth values (Zmax);
using different numbers of residual bits for Zmin residuals and for Zmax residuals;
wherein residual bits specify a difference value for each sample relative to either Zmin or Zmax.

2. The method of claim 1 including indicating adaptive depth offset compression by swapping Zmin and Zmax.

3. The method of claim 2 including, when adaptive offset is used, storing bits to indicate a distribution of residual bits for the residuals encoded relative to Zmin and Zmax.

4. The method of claim 3 including storing the residual bits for the samples that are encoded relative to Zmin using a first number of bits per residual and storing the residuals for the samples that are encoded relative to Zmax using a second number of bits, wherein the first and second numbers are different.

5. The method of claim 1 including deciding whether a depth sample belongs to a Zmin or Zmax range by creating histograms for Zmin and Zmax, where each bin represents how many samples may be encoded relative to a Zmin or Zmax value given a number of bits to represent the residuals.

6. The method of claim 5 including using the histogram and increasing the number of residual bits for a range to produce the least increase in a total bit count.

7. The method of claim 5 including computing a cumulative sum of the Zmax histogram and performing an exhaustive search for values of bits that indicate a distribution of residual bits for Zmax.

8. The method of claim 7 including determining the remaining number of samples that must be encoded relative to Zmin, determining the bit budget for encoding said amount of samples relative to Zmin, and determining if the cumulative sum of the Zmax histogram up to remaining bit budget is at least as large as remaining number of samples that need to be encoded relative to Zmax.

9. The method of claim 1 including storing two bits per sample to indicate by one combination a less dominant range distribution and by three combinations in more dominant range distribution.

10. The method of claim 9 including indicating whether to use one or two bits to represent the range distribution by storing a single bit extra per tile.

11. One or more non-transitory computer readable media storing instructions executed by one or more processors to perform a method comprising:
using a processor to decide whether to use depth offset compression or adaptive depth offset compression to encode depths of objects depicted in an image, wherein depth is a distance from an imaging device and wherein an adaptive depth offset compression swaps minimum depth (Zmin) values and maximum depth values (Zmax);
using different numbers of residual bits for Zmin residuals and for Zmax residuals;
wherein residual bits specify a difference value for each sample relative to either Zmin or Zmax.

12. The media of claim 11, said method including indicating adaptive depth offset compression by swapping Zmin and Zmax.

13. The media of claim 12, said method including when adaptive offset is used, storing bits to indicate a distribution of residual bits for the residuals encoded relative to Zmin and Zmax.

14. The media of claim 13, said method including storing the residual bits for the samples that are encoded relative to Zmin using a first number of bits per residual and storing the residuals for the samples that are encoded relative to Zmax using a second number of bits, wherein the first and second numbers are different.

15. The media of claim 11, said method including deciding whether a depth sample belongs to a Zmin or Zmax range by creating histograms for Zmin and Zmax, where each bin represents how many samples may be encoded relative to a Zmin or Zmax value given a number of bits to represent the residuals.

16. The media of claim 15, said method including using the histogram and increasing the number of residual bits for a range to produce the least increase in a total bit count.

17. The media of claim 15, said method including computing a cumulative sum of the Zmax histogram and testing all possible values of bits that indicate a distribution of residual bits for Zmax.

18. The media of claim 17, said method including determining the remaining number of samples that must be encoded relative to Zmax, determining the bit budget for encoding said amount of samples relative to Zmax, and determining if the cumulative sum of the Zmax histogram up to said bit budget is at least as large as said number of samples that need to be encoded relative to Zmax.

19. The media of claim 11, said method including storing two bits per sample to indicate by one combination a less dominant range distribution and by three combinations in more dominant range distribution.

20. The media of claim 19, said method including indicating whether to use one or two bits to represent the range distribution by storing a single bit extra per tile.

21. An apparatus comprising:
a processor to decide whether to use depth offset compression or adaptive depth offset compression to encode depths of objects depicted in an image, wherein depth is a distance from an imaging device and wherein an adaptive depth offset compression swaps minimum depth (Zmin) values and maximum depth values (Zmax), to use different numbers of residual bits for Zmin residuals and for Zmax residuals, wherein residual bits specify a difference value for each sample relative to either Zmin or Zmax; and
a memory coupled to said processor.

22. The apparatus of claim 21, said processor to indicate adaptive depth offset compression by swapping Zmin and Zmax.

23. The apparatus of claim 22 including, when adaptive offset is used, said processor to store bits to indicate a distribution of residual bits for the residuals encoded relative to Zmin and Zmax.

24. The apparatus of claim 23, said processor to store the residual bits for the samples that are encoded relative to Zmin using a first number of bits per residual and to store the residuals for the samples that are encoded relative to Zmax using a second number of bits, wherein the first and second numbers are different.

25. The apparatus of claim 21, said processor to decide whether a depth sample belongs to a Zmin or Zmax range by creating histograms for Zmin and Zmax, where each bin represents how many samples may be encoded relative to a Zmin or Zmax value given a number of bits to represent the residuals.

26. The apparatus of claim 25, said processor to use the histogram and increase the number of residual bits for a range to produce the least increase in a total bit count.

27. The apparatus of claim 25, said processor to compute a cumulative sum of the Zmax histogram and test all possible values of bits that indicate a distribution of residual bits for Zmax.

28. The apparatus of claim 21 including an operating system.

29. The apparatus of claim 21 including a battery.

30. The apparatus of claim 21 including firmware and a module to update said firmware.

* * * * *